United States Patent
Kam et al.

(10) Patent No.: US 10,075,280 B2
(45) Date of Patent: Sep. 11, 2018

(54) METHOD FOR SETTING RESOURCE FOR FDR COMMUNICATION BY NODE IN FDR COMMUNICATION ENVIRONMENT

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Seunglae Kam, Seoul (KR); Jaehoon Chung, Seoul (KR); Jinmin Kim, Seoul (KR); Haesoon Lee, Seoul (KR); Dongkyu Kim, Seoul (KR); Daesik Hong, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 107 days.

(21) Appl. No.: 15/112,627

(22) PCT Filed: Jan. 9, 2015

(86) PCT No.: PCT/KR2015/000229
§ 371 (c)(1),
(2) Date: Jul. 19, 2016

(87) PCT Pub. No.: WO2015/111859
PCT Pub. Date: Jul. 30, 2015

(65) Prior Publication Data
US 2016/0337111 A1  Nov. 17, 2016

Related U.S. Application Data

(60) Provisional application No. 61/930,914, filed on Jan. 23, 2014.

(51) Int. Cl.
 *H04L 5/14* (2006.01)
 *H04W 72/08* (2009.01)
 (Continued)

(52) U.S. Cl.
 CPC .............. *H04L 5/14* (2013.01); *H04L 5/001* (2013.01); *H04W 72/085* (2013.01); *H04W 88/08* (2013.01)

(58) Field of Classification Search
 CPC ........ H04L 5/14; H04L 5/001; H04W 72/085; H04W 88/08
 (Continued)

(56) References Cited

U.S. PATENT DOCUMENTS

| | | |
|---|---|---|
| 2008/0170544 A1 | 7/2008 | Tang et al. |
| 2012/0063373 A1 | 3/2012 | Chincholi et al. |

(Continued)

*Primary Examiner* — Obaidul Huq
(74) *Attorney, Agent, or Firm* — Birch, Stewart, Kolasch & Birch, LLP (57) ABSTRACT

Disclosed is a method for setting a resource for Full Duplex Radio (FDR) Communication by a node in an FDR communication environment. According to the method, resources for the FDR communication can be selected in consideration of channel information of the nodes performing the FDR communication to obtain an improved achievable sum rate compared to Half Duplex Radio (HDR) communication schemes and to acquire diversity effects.

10 Claims, 9 Drawing Sheets

(51) Int. Cl.
*H04L 5/00* (2006.01)
*H04W 88/08* (2009.01)

(58) Field of Classification Search
USPC .................................. 370/276, 277, 280
See application file for complete search history.

(56) References Cited

U.S. PATENT DOCUMENTS

| | | | |
|---|---|---|---|
| 2012/0201153 A1* | 8/2012 | Bharadia | H04B 1/525 370/252 |
| 2013/0044654 A1 | 2/2013 | Chen et al. | |
| 2013/0083672 A1 | 4/2013 | Johansson et al. | |
| 2013/0188536 A1 | 7/2013 | Pirskanen et al. | |
| 2014/0086081 A1* | 3/2014 | Mack | H04L 5/006 370/252 |

\* cited by examiner

METHOD FOR SETTING RESOURCE FOR FDR COMMUNICATION BY NODE IN FDR COMMUNICATION ENVIRONMENT

CROSS REFERENCE TO RELATED APPLICATIONS

This application is the National Phase of PCT/KR2015/000229 filed on Jan. 09, 2015, which claims priority under 35 U.S.C. § 119(e) to U.S. Provisional Application No. 61/930,914 filed on Jan. 23, 2014, all of which are hereby expressly incorporated by reference into the present application.

TECHNICAL FIELD

The present invention relates to a method of setting and scheduling resources for FDR communication in an environment in which FDR communication is performed between nodes.

BACKGROUND ART

A base station (BS) or a mobile terminal performs communication using a frequency division duplex (FDD) scheme, in which a transmission/reception resource of a signal is divided into frequencies, and a half duplex radio (HDR) scheme which employs a time division duplex (TDD) scheme, in which the transmission/reception resource is divided into time slots.

However, in the HDR communication scheme, transmission and reception cannot be performed simultaneously within the same frequency/time resource. Accordingly, introduction of the FDR communication scheme has been proposed for more efficient resource use. FDR communication refers to a scheme in which a BS or a terminal performs transmission and reception operations simultaneously using a resource of the same time-frequency region.

In FDR communication environments, since a BS and a terminal simultaneously perform transmission and reception using the same time-frequency resources, a signal transmitted from the BS or terminal is received through a reception antenna of the same BS or terminal, that is, self-interference is generated. Self-interference must be cancelled in order to guarantee FDR communication performance since a signal transmitted through a transmission antenna of a BS or a terminal is directly received through a reception antenna thereof and thus signal intensity is very high. Various schemes have been proposed in order to efficiently cancel such self-interference.

DISCLOSURE

Technical Problem

An object of the present invention devised to solve the problem lies in a method of setting resources for improving an achievable sum rate in an FDR communication environment.

Another object of the present invention is to provide a method of efficiently setting resources in consideration of channel information of nodes performing FDR communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of setting resources to be used for a base station (BS) to perform full duplex radio (FDR) communication in an FDR communication environment supporting carrier aggregation includes: estimating channel information on a plurality of frequency resources available through carrier aggregation; transmitting first channel information estimated for the frequency resources to a counterpart node with which the BS is to perform FDR communication; receiving second channel information estimated by the counterpart node; and selecting a frequency resource to be used for FDR communication from among the plurality of frequency resources in consideration of the first channel information transmitted to the counterpart node and the second channel information received from the counterpart node.

The BS may select the frequency resource such that the following equation is satisfied, $$k_F^* = \underset{k_F^*=1,\ldots,K}{\operatorname{argmax}} [(1 + \gamma_b^F h_{ab}^F)(1 + \gamma_a^F h_{ba}^F)],$$

wherein K indicates the number of the frequency resources, $k_F^*$ indicates an index of the frequency resource selected from among the plurality of frequency resources, $\gamma_a^F$ indicates a received signal-to-noise ratio (SNR) of the BS, $\gamma_b^F$ indicates a received SNR at the counterpart node, $h_{ab}^F$ indicates a channel value included in the first channel information, and $h_{ba}^F$ indicates a channel value included in the second channel information.

An achievable sum rate of an FDR communication system including the BS and the counterpart node may be represented by the following equation, $$C^F = [\log(1+\gamma_b^F h_{ab}^F) + \log(1+\gamma_a^F h_{ba}^F)],$$

wherein $C^F$ indicates the achievable sum rate of the FDR communication system, $\gamma_a^F$ indicates a received SNR of the BS, $\gamma_b^F$ indicates a received SNR of the counterpart node, $h_{ab}^F$ indicates a channel value included in the first channel information, and $h_{ba}^F$ indicates a channel value included in the second channel information.

The selected frequency resource may be simultaneously occupied by the BS and the counterpart node during FDR communication.

The frequency resource may be a component carrier (CC), a cell or a spectrum.

The counterpart node performing FDR communication with the BS may be another BS or a UE.

In another aspect of the present invention, a BS for setting resources to be used to perform FDR communication in an FDR communication environment supporting carrier aggregation includes: a transmitter; a receiver; and a processor connected to the transmitter and the receiver to set resources used to perform FDR communication, wherein the processor is configured to estimate channel information on a plurality of frequency resources available for the BS through carrier aggregation, to control the transmitter to transmit first channel information estimated for the frequency resources to a counterpart node with which the BS is to perform FDR communication, to control the receiver to receive second channel information estimated by the counterpart node and to select a frequency resource to be used for FDR communication from among the frequency resources in consideration of the first channel information transmitted to the counterpart node and the second channel information received from the counterpart node.

The aforementioned embodiments are merely parts of preferred embodiments of the present invention and various embodiments in which the technical features of the present invention are reflected can be derived and understood by a person skilled in the art on the basis of the following detailed description of the present invention.

Advantageous Effects

According to embodiments of the present invention, the following advantages can be obtained.

Firstly, frequency resources used in an FDR communication environment may be efficiently selected to increase the achievable sum rate of a communication system.

Secondly, resources may be selected in consideration of channel information of nodes performing FDR communication to obtain an improved achievable sum rate compared to HDR communication schemes and to acquire diversity effects.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Although the terms used in this specification are selected, as much as possible, from general terms that are widely used at present while taking into consideration the functions of the elements obtained in accordance with one embodiment, these terms may be replaced by other terms based on intentions of those skilled in the art, customs, emergence of new technologies, or the like. In addition, in certain instances, terms that are arbitrarily selected by the applicant may be used. In this case, meanings of these terms will be disclosed in detail in the corresponding part of the description of the invention. Accordingly, the terms used herein should be defined based on practical meanings thereof and the whole content of this specification, rather than based on names of the terms.

The embodiments described below are constructed by combining elements and features of the present invention in a predetermined form. The elements or features may be considered selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features from another embodiment.

In describing the drawings, procedures or steps, which may obscure the main point of the present invention, will not be described nor will description of procedures or steps, which may be understood by those having ordinary skill in the art, be given.

In this specification, "comprise" or "include" should be understood as not precluding existence of one or more other constituents, if not stated otherwise. In addition, the terms "unit", "-er", "module", etc. signify a unit that processes at least one function or operation and may be implemented in hardware, software, or a combination of hardware and software. As used in the specification and appended claims, the terms "a", "an", "one", "the" and other similar terms include both singular and plural forms, unless context clearly dictates otherwise.

In this specification, embodiments of the present invention are described, focusing on the relationship between a base station (BS) and a mobile station (MS) in transmission/reception of data. Herein, the base station serves as a terminal node of a network that directly performs communication with mobile stations. In this document, an operation described as being performed by the base station may be performed by an upper node of the base station in some cases.

That is, in a network comprised of a plurality of network nodes including a BS, various operations performed for communication with an MS may be performed by the BS, or network nodes other than the BS. The term "base station"

may be replaced with the terms "fixed station", "Node B", "eNode B (eNB)", "advanced base station (ABS)", or "access point".

In addition, the term "mobile station (MS)" may be replaced with a term "user equipment (UE)", "subscriber station (SS)", "mobile subscriber station (MSS)", "mobile terminal", "advanced mobile station (AMS)", or "terminal". Particularly, the term mobile station used in this specification may have same meaning as the term machine-to-machine device.

A transmitter refers to a fixed and/or mobile node that provides a data service or a voice service, and a receiver refers to a fixed and/or mobile node that receives a data service or a voice service. Therefore, an MS may serve as a transmitter and a BS may serve as a receiver, on uplink. Likewise, the MS may serve as a receiver and the BS may serve as a transmitter, on downlink.

Embodiments of the present invention may be supported by standard documents disclosed for at least one of an IEEE 802.xx system, a 3GPP system, a 3GPP LTE system and a 3GPP2 system, which are wireless access systems. That is, obvious steps or portions which are not described in the embodiments of the present invention may be supported by the above documents.

All terms used herein may be explained by the standard documents. Particularly, the embodiments of the present invention may be supported by at least one of P802.16e-2004, P802.16e-2005, P802.16.1, P802.16p and P802.16.1b, which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In the following description of the embodiments of the present invention, specific terms are used in order to provide a thorough understanding of the present invention. These terms may be changed without departing from the spirit of the present invention.

1. FDR Communication Environment and Self-Interference

Figure 1:
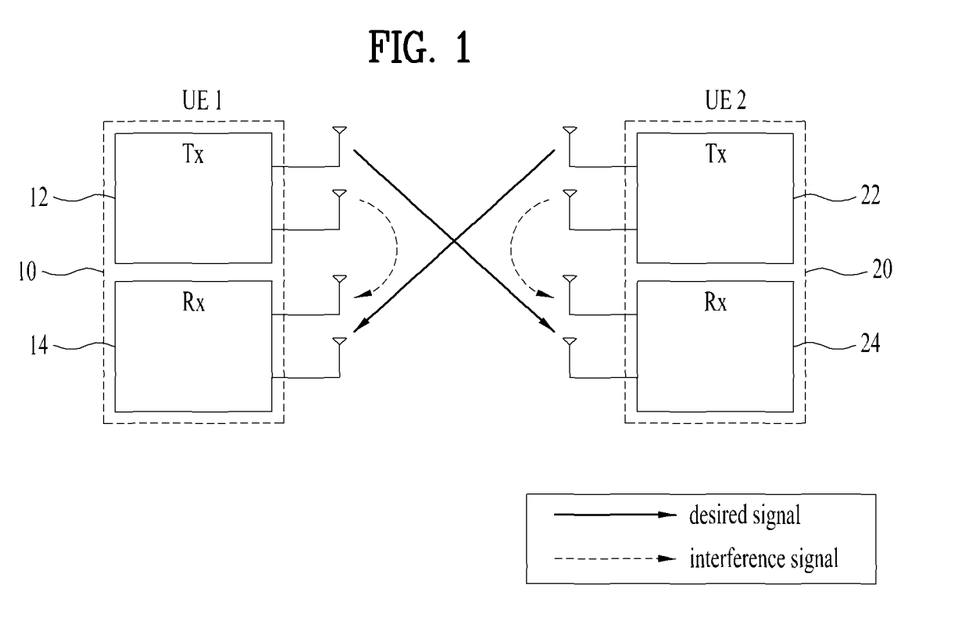
FIG. 1 is a diagram illustrating an FDR communication environment.

FIG. 1 is a diagram illustrating an FDR communication environment. As described above, in an FDR communication environment, a BS and a UE perform uplink or downlink communication using the same frequency/time resources.

As shown in FIG. 1, since UE1 10 and UE2 20 perform communication using the same frequency/time resources in the FDR communication environment, each UE needs to simultaneously perform reception of a signal transmitted from a BS or the other UE and transmission of a signal thereto. Accordingly, a communication environment in which signals transmitted through transmission antennas 12 and 22 of UE1 and UE2 are directly input to reception antennas 14 and 24 thereof to cause self-interference is formed, as represented by dotted lines in FIG. 1.

Figure 2:
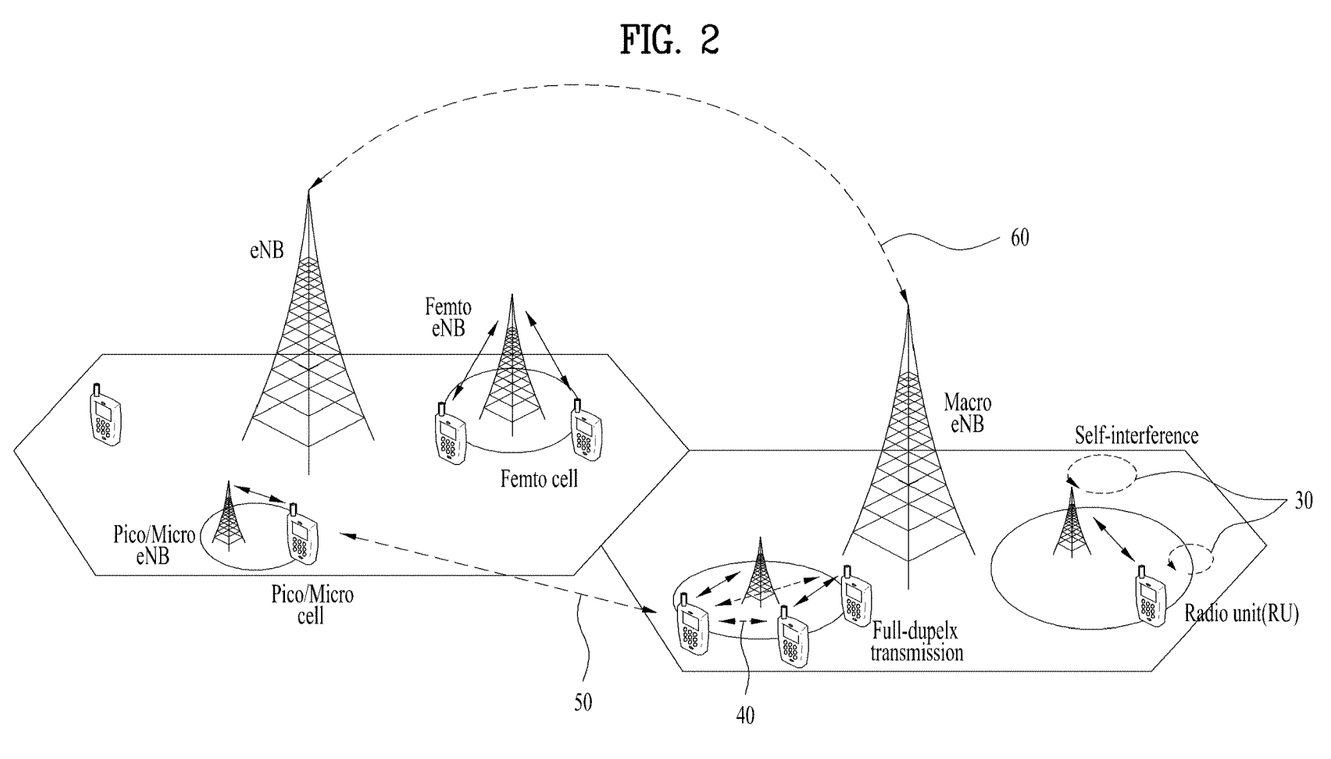
FIG. 2 is a diagram for explaining interferences generated in an FDR communication environment.

FIG. 2 is a diagram for explaining interferences generated in an FDR communication environment.

FIG. 2 shows a multi-cell environment in which a macro cell formed by a macro BS and small cells (pico/femto/micro cells) formed by pico/femto/micro BSs coexist. When FDR communication is performed in such a multi-cell environment, various interferences need to be considered. Referring to FIG. 2, self interference or self-user interference, multi-user interference, inter-BS interference and the like need to be considered according to introduction of FDR communication.

First, regarding self-interference, the transmitter and receiver of a UE or a BS performs transmission and reception using the same time/frequency resource. Since the transmitter and receiver are positioned close to each other, a signal transmitted from a UE or a BS may be introduced into the receiver of the same UE or BS. In FIG. 2, reference numeral 30 denotes self-interference of the BS and UEs.

Multi-user interference may occur when two or more UEs positioned close enough to affect each other communicate with each other using the same time/frequency resource. FIG. 2 exemplarily shows multi-user interferences 40 and 50 occurring between UEs according to FDR communication therebetween.

Lastly, inter-BS interference, which is similar to the aforementioned multi-user interference, may occur between two or more BSs. FIG. 2 shows inter-BS interference 60.

As described above, while FDR communication can increase frequency efficiency by sharing the same time/frequency resources on uplink/downlink, frequency efficiency enhancement may be restricted due to interference increase.

From among interferences generated according to FDR communication, self-interference is received with high intensity of approximately 60 to 90 dB compared to intensity of a desired signal. Since self-interference considerably affects signal processing of a receiving end compared to other types of interference, a process of cancelling self-interference is very important in FDR communication. A description will be given of a method of cancelling self-interference in FDR communication.

Figure 3:
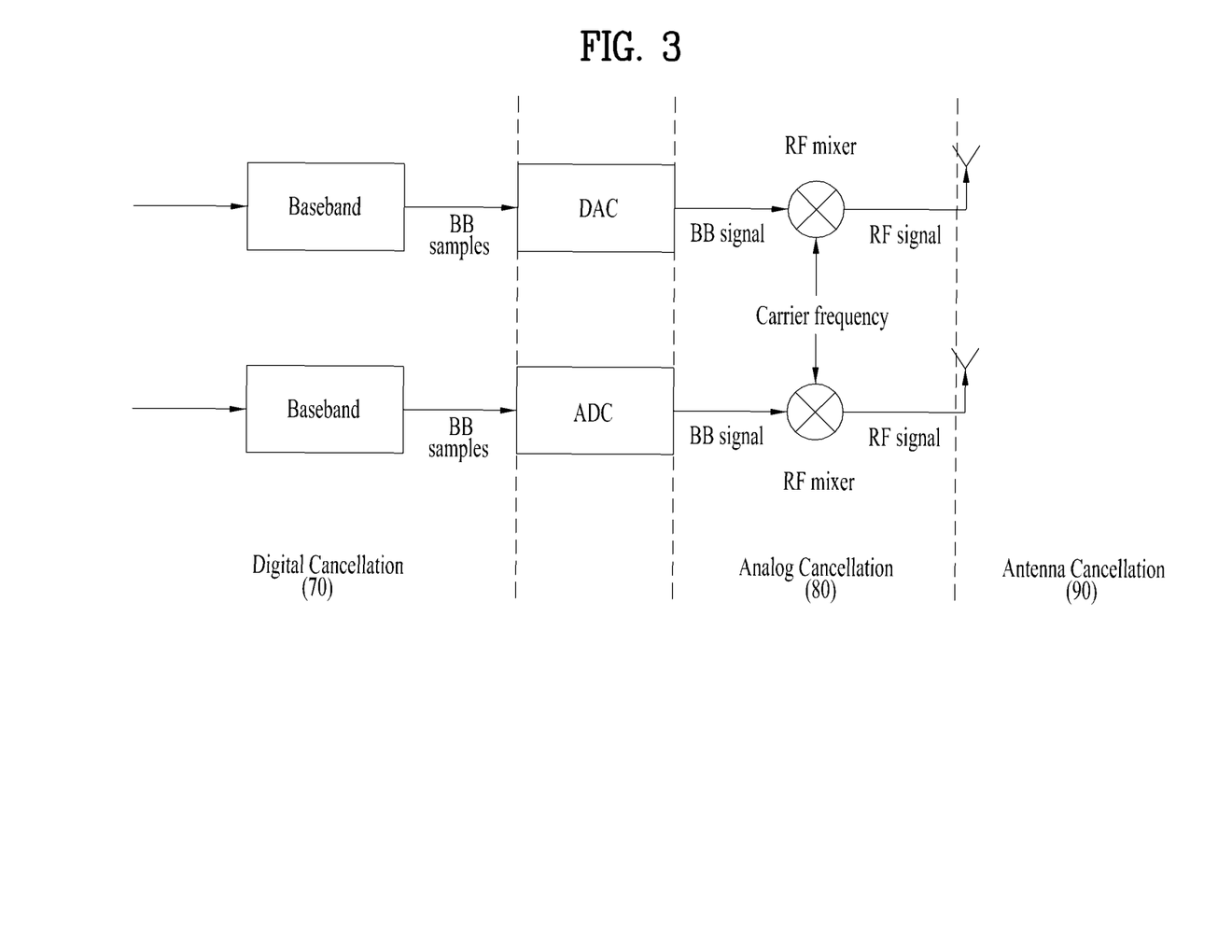
FIG. 3 is a diagram illustrating methods for cancelling interference in an FDR communication environment.

FIG. 3 is a diagram illustrating methods for cancelling interference in an FDR communication environment.

In FIG. 3, as methods for cancellation of self-interference, digital cancellation 70, which is applied before signals processed in a base band pass through a digital-to-analog converter (DAC) (or after reception signals pass through an analog-to-digital converter (ADC)), analog cancellation 80, which is applied after a transmission signal passes through a DAC (or before a reception signal passes through an ADC), and antenna cancellation 90 of cancelling an aggregate signal received through a transmit antenna by adjusting the distances between two or more transmit antennas are proposed.

Figure 4:
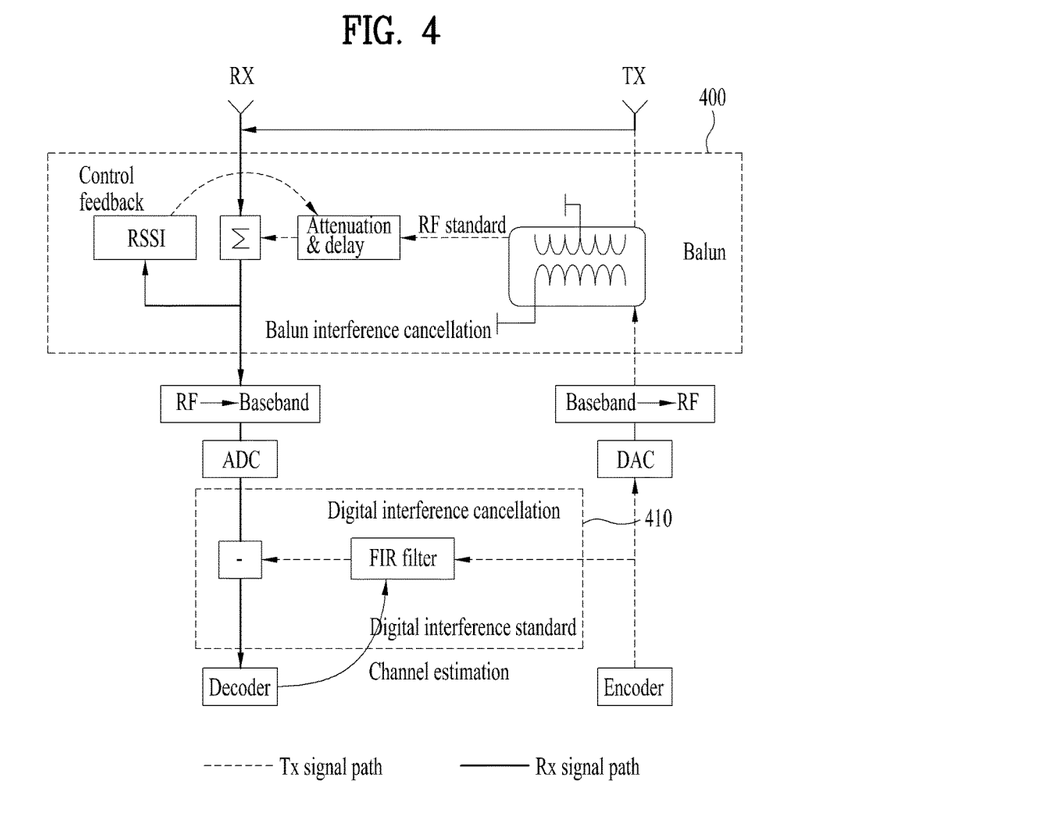
FIG. 4 is a diagram illustrating digital interference cancellation and analog interference cancellation for canceling interference in an FDR communication environment.

FIG. 4 illustrates digital interference cancellation and analog interference cancellation for cancelling interference in FDR communication. In the case of digital cancellation 410, various techniques such as beamforming may be applied to cancel self-interference, and the range of interference cancellation may be between about 20 dB and 25 dB.

In analog cancellation 400, which is implemented in a second chain of transmit chains, which is between digital cancellation and antenna cancellation, interference cancellation signals are directly created through digital estimation of self-interference and summed in the receiver. That is, analog cancellation may be implemented such that directly received transmission/reception signals are cancelled by adding a signal produced by inverting a signal of the transmitter to a signal of the receiver. The maximum cancellation range of antenna cancellation may be 45 dB.

Figure 5:
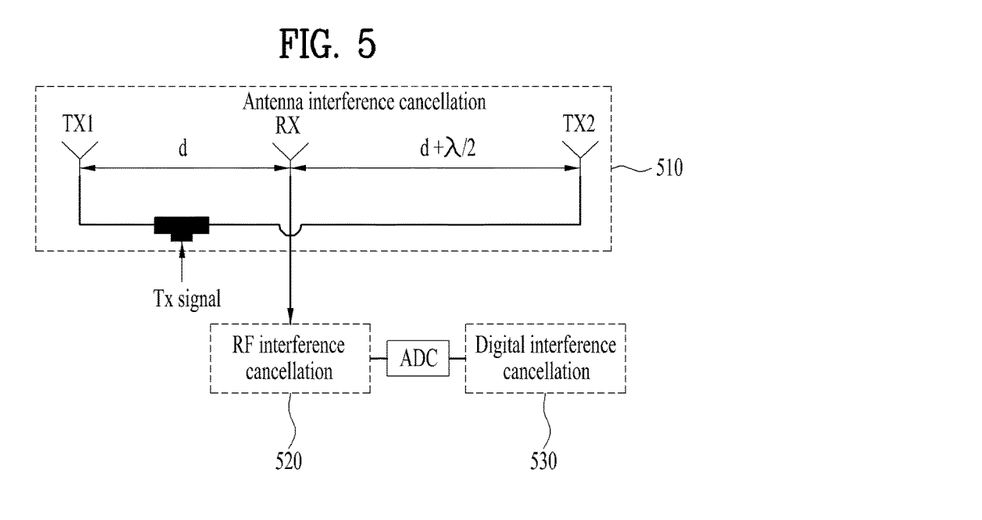
FIG. 5 is a diagram illustrating antenna interference cancellation for cancelling interference in an FDR communication environment.

FIG. 5 illustrates antenna interference cancellation for cancelling interference in an FDR communication environment.

In antenna cancellation 510, a transceiver configured with two transmit antennas and one receive antenna causes signals transmitted from the two transmit antennas to have phases inverted by 180 degrees when the signals are introduced into the receive antenna. Thereby, antenna cancellation may be implemented such that the phase difference between the signals transmitted from the two transmit antennas becomes 180 degrees. Thereby, the aggregate signal received by the received antenna positioned between the transmit antennas may become null, i.e., 0. In other words, if the two transmit antennas are spaced apart from the receive antenna such that the distance between one transmit antenna and the receiver differs by $\lambda/2$ from the distance between the other transmit antenna and the receive antenna, the phases of the signals input to the receive antenna differ from each other by exactly 180 degrees.

In general, the antenna cancellation technique has low complexity and is thus easiest to implement. However, the maximum interference cancellation performance of the antenna cancellation technique is about 20-30 dB, while a self-interference cancellation performance of about 70 dB is required for the FDR system. Accordingly, self-interference cancellation may be achieved through a combination of the aforementioned three techniques 510, 520 and 530. However, there is a specific communication environment in which the performance of antenna cancellation can be maximized.

Figure 6:
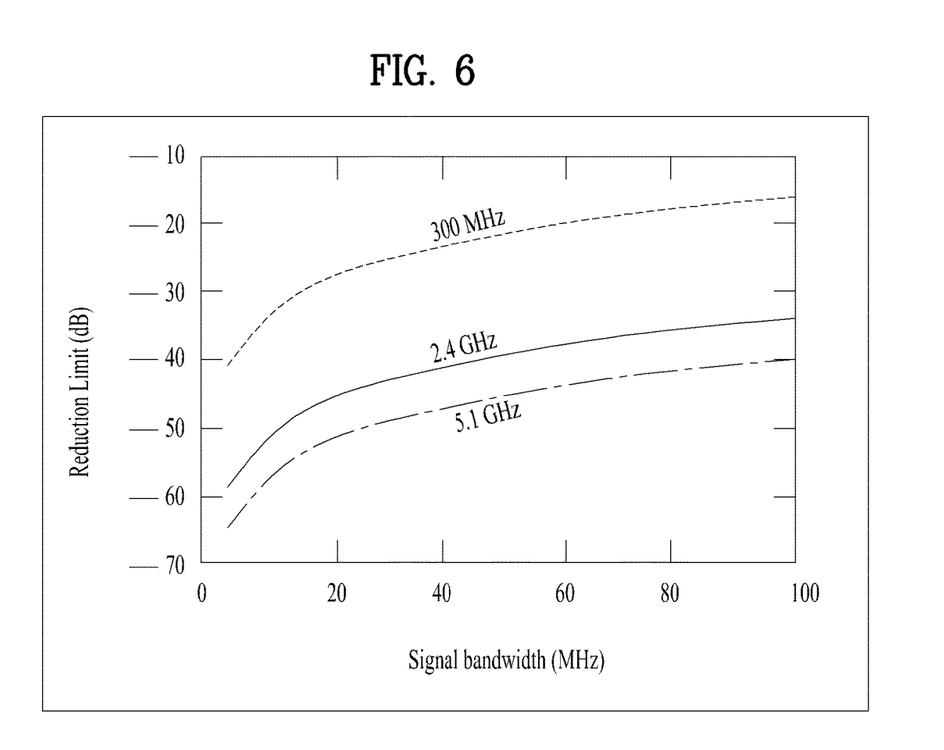
FIG. 6 is a diagram illustrating interference cancellation efficiency according to antenna interference cancellation in an FDR communication environment.

FIG. 6 illustrates interference cancellation efficiency according to antenna interference cancellation in an FDR communication environment.

As shown in FIG. 6, as system bandwidth decreases and the center frequency is shifted to a higher frequency, the performance of antenna cancellation drastically increases. Accordingly, if a narrow high frequency band is allocated to the FDR communication region, sufficient performance of self-interference cancellation may be ensured by the antenna cancellation technique alone. Accordingly, FDR performance may be ensured, and implementation complexity may also be lowered. A high frequency band of transmission is directed to broadband communication, in which transmission is implemented using a wide frequency band. Accordingly, if a region of the high frequency band of transmission is set as a band for FDR communication, an environment advantageous for self-interference cancellation through antenna cancellation may be created, and thus sufficient performance of self-interference cancellation may be achieved.

2. Carrier Aggregation (CA) and Bidirectional FDR

A description will be given of carrier aggregation with reference to FIGS. 7 and 8.

Figure 7:
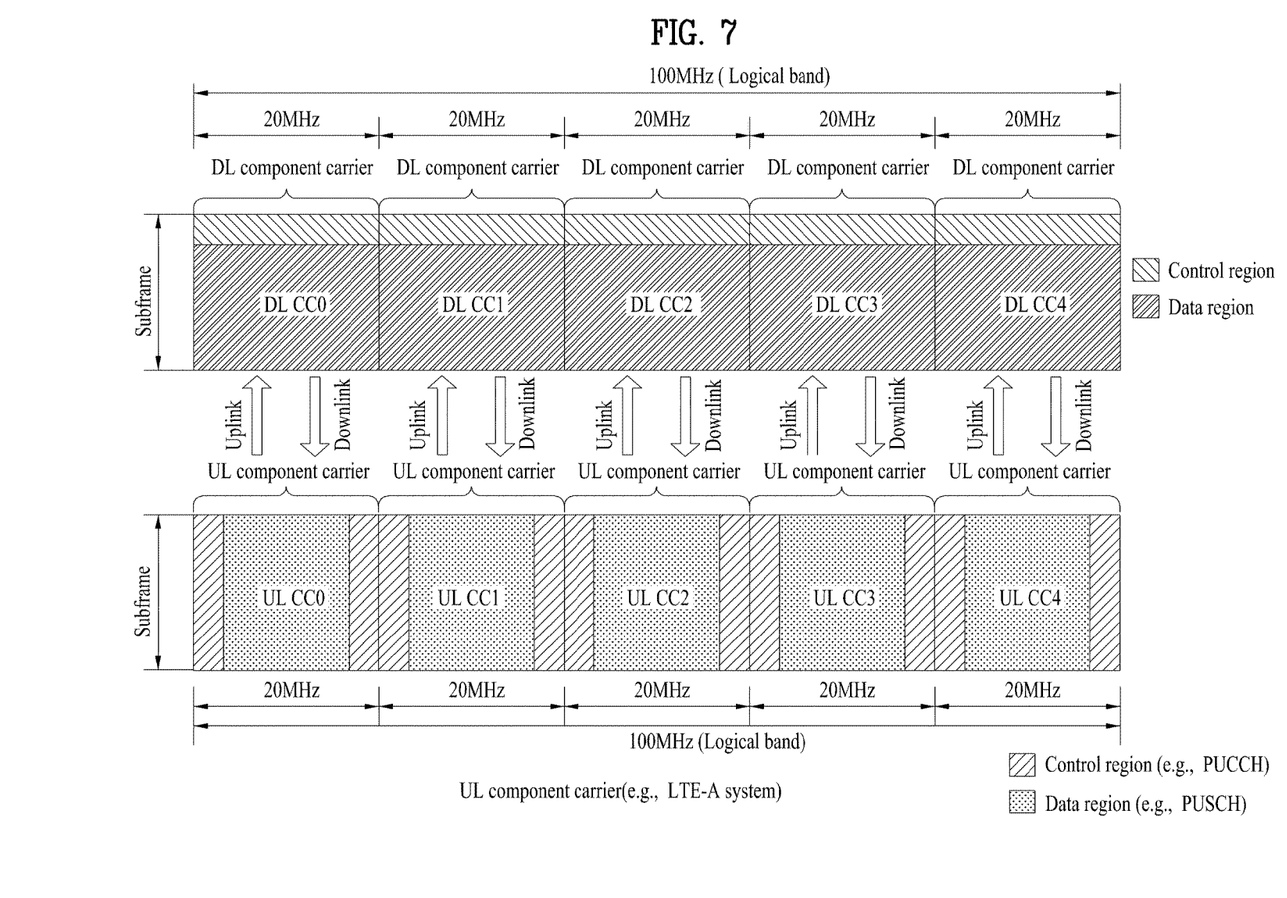
FIG. 7 is a diagram illustrating carrier aggregation related to the present invention.

FIG. 7 illustrates carrier aggregation related to the present invention. Referring to FIG. 7, a communication system may support wider uplink/downlink bandwidths by aggregating a plurality of uplink/downlink component carriers (CCs). The term "component carrier (CC)" may be replaced by other equivalent terms (e.g., carrier, cell, spectrum and the like). CCs may be contiguous or non-continuous in the frequency domain. Bandwidths of CCs may be independently set. Asymmetrical carrier aggregation in which the number of UL CCs differs from the number of DL CCs may be possible. Control information may be configured to be transmitted and received only through a specific CC. Such specific CC may be referred to as a primary CC (or anchor CC) and other CCs may be referred to as secondary CCs.

When cross-carrier scheduling (or cross-CC scheduling) is applied, a PDCCH for downlink assignment may be transmitted on DL CC #0 and a PDSCH corresponding thereto may be transmitted on DL CC #2. For cross-CC scheduling, introduction of a carrier indicator field (CIF) may be considered. Presence or absence of the CIF in a PDCCH may be determined by higher layer signaling (e.g. RRC signaling) semi-statically and UE-specifically (or UE group-specifically). The baseline of PDCCH transmission is summarized as follows.

1) CIF disabled: a PDCCH on a DL CC is used to allocate a PDSCH resource on the same DL CC or a PUSCH resource on a linked UL CC.

1-1) No CIF 1-2) LTE PDCCH structure (resource mapping based on the same coding and same CCE)

2) CIF enabled: a PDCCH on a DL CC may be used to allocate a PDSCH or PUSCH resource on a specific DL/UL CC from among a plurality of aggregated DL/UL CCs using the CIF.

2-1) LTE DCI format extended to have the CIF 2-1-1) CIF corresponds to a fixed x-bit field (e.g. x=3) (when the CIF is set).

2-1-2) CIF position is fixed irrespective of DCI format size (when the CIF is set).

2-2) LTE PDCCH structure is reused (resource mapping based on the same coding and same CCE)

Figure 9:
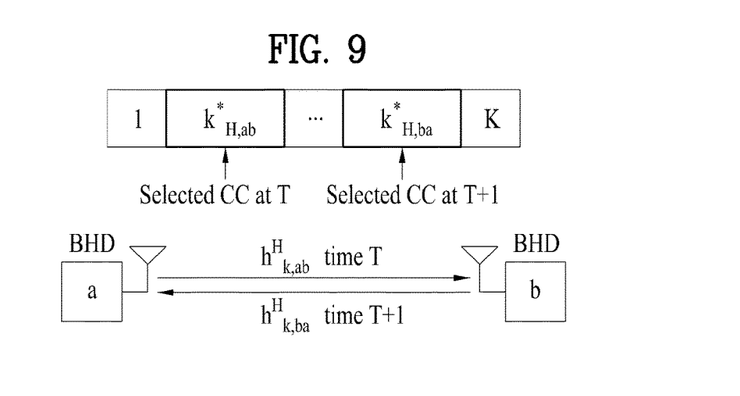
FIG. 9 is a diagram illustrating a process of selecting a frequency resource in a multi-spectrum based HDR communication environment.

FIG. 9 is a diagram illustrating cross scheduling when a plurality of carriers is aggregated according to the present invention.

When the CIF is present, a BS may allocate a PDCCH monitoring DL CC set in order to reduce blind decoding complexity of a UE. The PDCCH monitoring DL CC set includes one or more DL CCs as part of aggregated DL CCs, and the UE performs PDCCH detection/decoding only on the corresponding DL CCs. That is, when the BS schedules a PDSCH/PUSCH for the UE, the PDCCH is transmitted only through the PDCCH monitoring DL CC set. The PDCCH monitoring DL CC set may be set UE-specifically, UE-group-specifically or cell-specifically. The term "PDCCH monitoring DL CC" may be replaced by an equivalent term such as "monitoring cell". In addition, CCs aggregated for a UE may be replaced by equivalent terms such as serving CCs, serving carriers, serving cells and the like.

Figure 8:
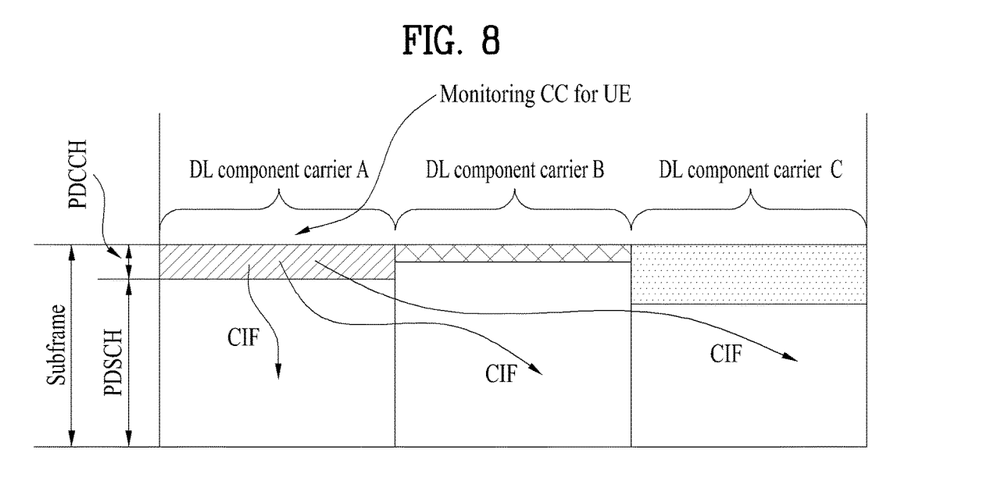
FIG. 8 is a diagram illustrating cross scheduling in the case of multi-carrier aggregation related to the present invention.

As shown in FIG. 8, 3 DL CCs may be aggregated. In FIG. 8, DL CC A is set to a PDCCH monitoring DL CC. DL CC A, DL CC B and DL CC C may be called serving CCs, serving carriers, serving cells, etc. In case of CIF disabled, a DL CC can carry only a PDCCH that schedules a PDSCH corresponding to the DL CC without a CIF according to LTE PDCCH configuration. When the CIF is enabled according to UE-specific (or UE-group-specific or cell-specific) higher layer signaling, DL CC A (monitoring DL CC) may carry not only a PDCCH that schedules the PDSCH corresponding to the DL CC A but also PDCCHs that schedule PDSCHs of other DL CCs using the CIF. In this case, a PDCCH is not transmitted on DL CC B/DL CC C, which are not set to PDCCH monitoring DL CCs. Accordingly, DL CC A (monitoring DL CC) needs to include all of a PDCCH search region associated with DL CC A, a PDCCH search region associated with DL CC B and a PDCCH search space associated with DL CC C. In the specification, it is assumed that a PDCCH search region is defined per carrier.

As described above, LTE-A considers use of the CIF in a PDCCH for cross-CC scheduling. Whether the CIF is used (that is, whether the cross-CC scheduling mode or non-cross-CC scheduling mode is supported) and switching between modes may be semi-statically/UE-specifically set through RRC signaling. The UE may recognize whether the CIF is used in a PDCCH that will be scheduled for the UE after passing through RRC signaling.

A description will be given of carrier aggregation in a bidirectional FDR communication environment.

A bidirectional FDR system was proposed to implement FDR (BFD) communication using multiple antennas. The BFD system uses the same frequency and time resources instead of separating spatial resources using multiple antennas of each node. Accordingly, the BFD system enables FDR communication between nodes using the same time and frequency resources. That is, the BFD system enables bidirectional communication according to FDR through separation of spatial resources using multiple antennas without separation of orthogonal resources, which is a bidirectional communication performance restriction factor. Furthermore, even in a case in which self-interference is present in an FDR communication environment where transmission and reception are simultaneously performed using a single antenna, interference may be cancelled by applying the aforementioned interference cancellation schemes to FDR communication, to efficiently enhance system yield.

3. Frequency Resource Setting Method in FDR Environment

Carrier aggregation is applicable even in an FDR communication environment. The performance of an FDR communication system to which carrier aggregation (i.e., multi-spectrum) is applied may be represented by an achievable sum rate. That is, the performance of an FDR communication system to which carrier aggregation is applied may be evaluated through the achievable sum rate.

If CCs, which are frequency resources to be used in a communication system to which carrier aggregation is applied, are determined, an achievable sum rate of an HDR communication system is represented by the following equation 1.

$$C^H = \frac{1}{2} \times E[C^H_{ab} + C^H_{ba}] \ (nats/\sec/Hz)$$ [Equation 1]

When node A and node B perform HDR communication, $C^H_{ab}$ indicates channel capacity when HDR communication from node A to node B is performed, $C^H_{ba}$ indicates channel capacity when HDR communication from node B to node A is performed, and $C_h$ indicates an achievable sum rate corresponding to the sum of capacities of channels transmitted by the nodes through HDR communication in Equation 1.

When CCs to be used in a communication system to which carrier aggregation is applied are determined, an achievable sum rate of an FDR communication system is represented by the following equation 2.

$$C^F = E[C^F_{ab} + C^F_{ba}](nats/\sec/Hz)$$ [Equation 2]

In Equation 2, $C^F_{ab}$ indicates channel capacity when FDR communication from node A to node B is performed, $C^F_{ba}$ indicates channel capacity when FDR communication from node B to node A is performed, and $C^F$ indicates an achievable sum rate corresponding to the sum of capacities of channels transmitted by the nodes through FDR communication.

It can be known from Equation 1 and Equation 2 that pre_log factor of the achievable sum rate of HDR communication to which carrier aggregation is applied is half the achievable sum rate of FDR communication. This is because the two nodes simultaneously use frequency and time resources in FDR communication whereas the two nodes separately use frequency and time resources in HDR communication.

Figure 10:
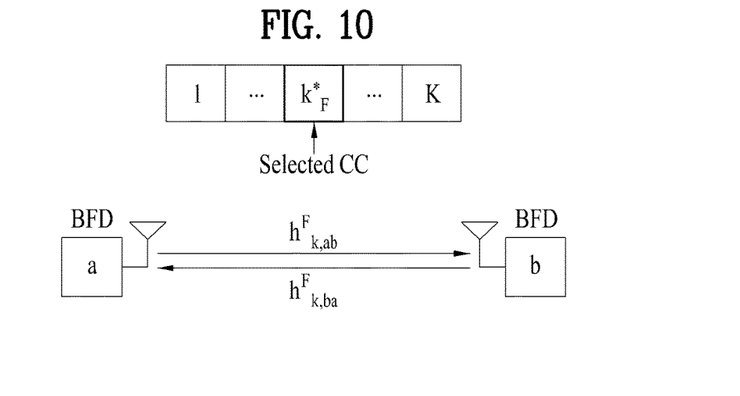
FIG. 10 is a diagram illustrating a process of selecting a frequency resource in a multi-spectrum based FDR communication environment.

FIG. 9 is a diagram illustrating a process of selecting a frequency resource in a multi-spectrum based HDR communication environment and FIG. 10 is a diagram illustrating a process of selecting a frequency resource in a multi-spectrum based FDR communication environment.

FIG. 9 illustrates a frequency resource selection process in an HDR communication system operating based on time division duplex (TDD) in bidirectional communication. As shown, when node A intends to transmit a signal to node B at time T, node A selects a CC corresponding to a largest channel size from among available frequency resources (e.g. CCs or spectra) and transmit data using the selected CC. Here, the index of the selected CC is $k^*_{H,ab}$. To transmit a signal to node A at time T+1, node B selects a CC corresponding to a largest channel size from among available frequency resources and transmits data using the selected CC. Here, the index of the selected CC is $k^*_{H,ba}$.

When a signal is transmitted according to HDR in carrier aggregation based bidirectional communication, each node selects a CC corresponding to a largest channel size from among frequency resources and uses the selected CC. Accordingly, each node can obtain diversity effect and mitigate fading. However, when a signal is transmitted according to HDR, the achievable sum rate is reduced, compared to FDR communication, due to division of time or frequency resources.

Accordingly, there is a need for a resource setting method for achieving diversity effect through carrier aggregation while using FDR communication capable of obtaining an achievable sum rate about twice that of HDR communication.

FIG. 10 illustrates a frequency selection process in a carrier aggregation based FDR communication environment. In the embodiment illustrated in FIG. 10, when two nodes respectively include a single transmission/reception antenna, an environment in which self-interference is cancelled through isolation and interference cancellation is assumed for the antenna of each node. In addition, it is assumed that the two nodes can estimate perfect channel information in FIG. 10. Furthermore, it is assumed that the two nodes transmit estimated channel information to the other nodes through feedback and the channel information is perfectly delivered to the other nodes.

In the FDR communication environment based on the aforementioned assumption, the achievable sum rate may be represented by the following equation 3.

$$C^F = E[C^F_{k,ab} + C^F_{k,ba}](nats/\sec/Hz)$$ [Equation 3]

In Equation 3, $C^F$ indicates the achievable sum rate of an FDR communication system based on carrier aggregation. $C^F_{k,ab}$ indicates channel capacity of node B when node B uses a k-th frequency according to FDR communication and $C^F_{k,ba}$ indicates channel capacity of node A when node A uses the k-th frequency according to FDR communication. k indicates the index of a frequency resource, i.e., a CC, selected in the carrier aggregation based FDR communication environment and E[·] represents an expectation of Equation 3.

A proposed resource setting method refers to a process of acquiring k that maximizes the sum of channel capacities of the nodes in Equation 3. In Equation 3, channel capacities of node A and node B may be represented as channels and received signal-to-noise ratios (SNRs) and the achievable sum rate is represented by Equation 4.

$$C^F = [\log(1+\gamma^F_b h^F_{ab}) + \log(1+\gamma^F_a h^F_{ba})](nats/\sec/Hz)$$ [Equation 4]

In Equation 4, $\gamma^F_a$ indicates a received SNR at node A and $\gamma^F_b$ indicates a received SNR at node B. In Equation 4, $h^F_{ab}$ indicates a channel value when node A transmits a signal to node B and $h^F_{ba}$ indicates a channel value when node B transmits a signal to node A.

Since the sum of natural logarithm functions can be represented by a product in Equation 4, Equation 5 is derived.

$$C^F = [\log(1+\gamma^F_b h^F_{ab})(1+\gamma^F_a h^F_{ba})](\text{nats/sec/Hz}) \quad \text{[Equation 5]}$$

One of the characteristics of the natural logarithm function is a monotonic increase function. That is, the function does not decrease within a defined range. Accordingly, a CC index that can maximize the achievable sum rate of the FDR communication system from Equation 5 may be calculated through the following equation 6.

$$k^*_F = \underset{k^*_F=1,\ldots,K}{\operatorname{argmax}} [(1+\gamma^F_b h^F_{ab})(1+\gamma^F_a h^F_{ba})] \quad \text{[Equation 6]}$$

According to the resource setting method based on Equation 6, frequency resources may be selected in consideration of both channels of the two nodes in carrier aggregation based FDR communication and the achievable sum rate of the FDR communication system may be maximized.

Figure 11:
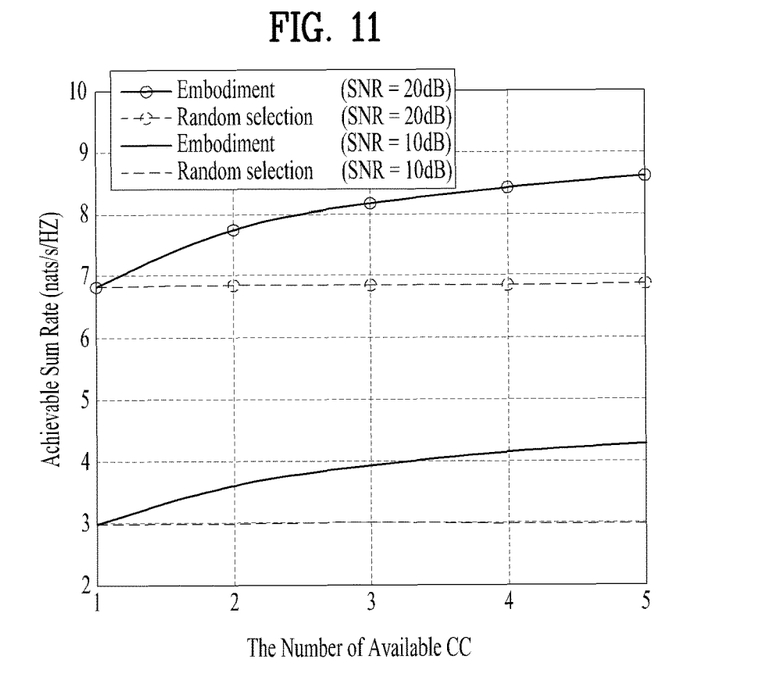
FIG. 11 is a diagram illustrating an achievable sum rate improved according to a proposed resource setting method.
Figure 12:
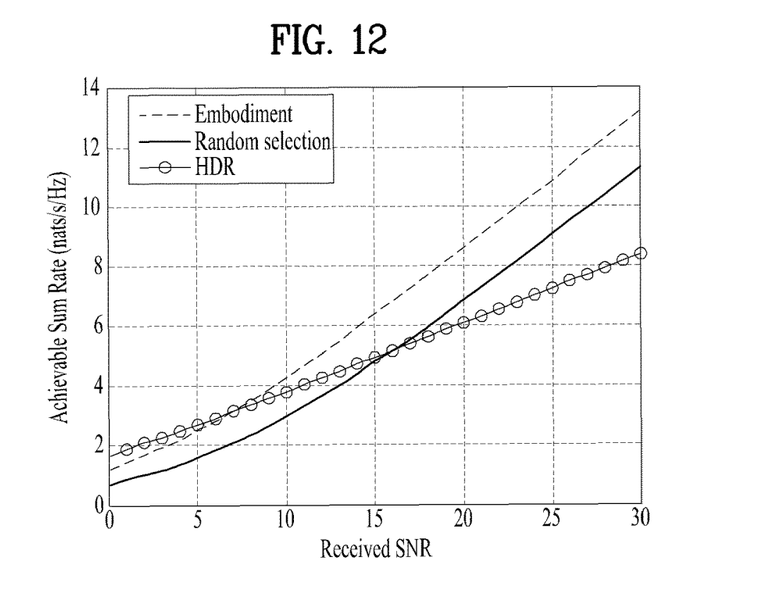
FIG. 12 is a diagram illustrating the achievable sum rate improved according to the proposed resource setting method through an SINR.

FIGS. 11 and 12 are diagrams illustrating achievable sum rates improved according to the proposed resource setting method.

FIG. 11 is a diagram illustrating achievable sum rates when the aforementioned resource setting method is applied to carrier aggregation based FDR communication. In FIG. 11, the horizontal axis indicates the number of available CCs (or spectra) and the vertical axis indicates the achievable sum rate of the FDR communication system described with reference to Equation 5.

In FIG. 11, solid lines in the graph indicate achievable sum rates according to the embodiment based on Equation 6 and dotted lines indicate achievable sum rates when the FDR communication system randomly selects frequency resources. Specifically, a solid line and a dotted line having circles indicate cases of an SNR of 20 dB and a solid line and a dotted line having no circle indicate cases of an SNR of 10 dB.

It may be confirmed form FIG. 11 that the achievable sum rate according to the proposed resource setting method increases as the number of available frequency resources (i.e., CCs) increases. When frequency resources are randomly selected, the achievable sum rate does not increase even when the number of available frequency resources increases. This is because diversity gain generated according to carrier aggregation cannot be obtained when frequency resources are randomly selected.

However, in the resource setting method based on Equation 6, two nodes select frequency resources in consideration of channels thereof and thus the nodes can use the best channels from among frequency resource candidates assigned thereto. Accordingly, the performance of the FDR communication system is improved due to diversity gain. In addition, since the probability that better channels are present increases as the number of available frequency resources increases, a higher achievable sum rate can be expected.

FIG. 12 illustrates achievable sum rates when the aforementioned resource setting method is applied to carrier aggregation based FDR communication. FIG. 12 illustrates achievable sum rates of an HDR communication system and an FDR communication system when both communication systems use 5 CCs as available frequency resources.

A dotted line in the graph indicates an achievable sum rate when the FDR communication system selects frequency resources according to the embodiment based on Equation 6, and a solid line having circles indicates an achievable sum rate when the FDR communication system randomly selects frequency resources. A solid line in the graph indicates an achievable sum rate when the HDR communication system is used.

It can be confirmed from FIG. 12 that the achievable sum rate of the FDR communication system increases more rapidly as SNR increases. This is because the FDR communication system can simultaneously use frequency resources and time resources, distinguished from the HDR communication system that separately uses frequency resources and time resources. As in the case of FIG. 11, it can be confirmed from FIG. 12 that the FDR communication system obtains a higher achievable sum rate when selecting frequency resources according to the method based on Equation 6 than when randomly selecting frequency resources.

Figure 13:
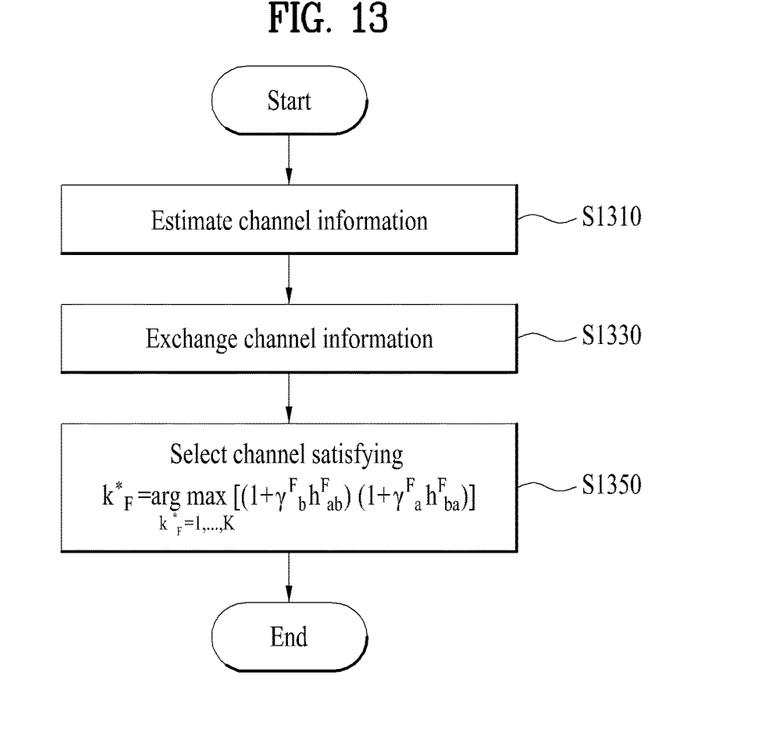
FIG. 13 is a flowchart illustrating the proposed resource setting method.

FIG. 13 is a flowchart illustrating the proposed resource setting method. FIG. 13 illustrates a method by which a node performing FDR communication sets resources. Node A (e.g., a BS or UE) performing FDR communication estimates channel information of available frequency resources (CCs or spectra) thereof (S1310). Here, node B to perform FDR communication with node A estimates channel information of available frequency resources thereof.

Subsequently, node A transmits the channel information estimated and measured thereby to node B. That is, node A and node B exchange measured channel information (S1330). Node A determines the index k of a frequency resource through which data will be transmitted according to FDR communication in consideration of the channel information measured thereby and the channel information received from node B (S1350). In the same manner, node B selects a frequency resource used for FDR communication on the basis of the channel information measured thereby and the channel information received from node A.

Upon selection of the frequency resources, node A and node B perform FDR communication to exchange data.

4. Apparatus Configuration

Figure 14:
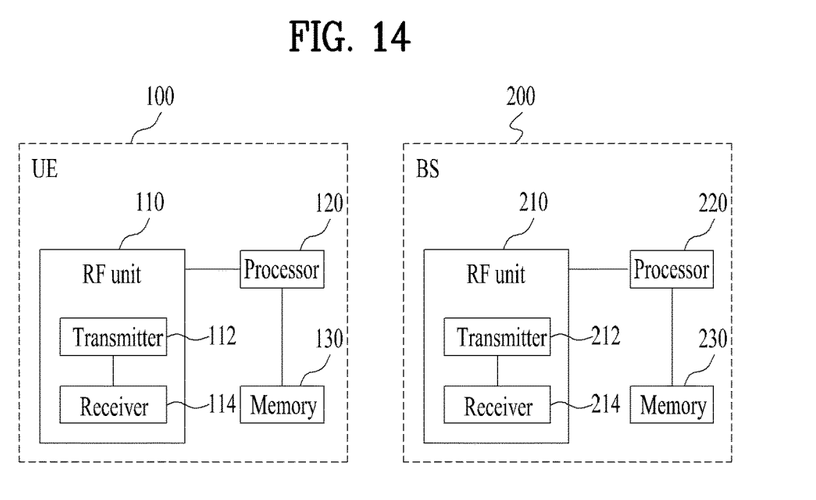
FIG. 14 is a block diagram illustrating configurations of a UE and a base station according to an embodiment of the present invention.

FIG. 14 is a block diagram of a UE and a BS according to an embodiment of the present invention.

Referring to FIG. 14, a UE 100 and a BS 200 may respectively include radio frequency (RF) units 110 and 210, processors 120 and 220 and memories 130 and 230. While FIG. 14 shows one-to-one communication between the UE 100 and the BS 200, communication between a plurality of UEs and the BS 200 may be performed.

The RF units 110 and 210 may respectively include transmitters 112 and 212 and receivers 114 and 214. The transmitter 112 and the receiver 114 of the UE 100 may be configured to transmit/receive signals to/from the BS 200 and other UEs. The processor 120 of the UE 100 may be functionally connected to the transmitter 112 and the receiver 114 to control the transmitter 112 and the receiver 114 to transmit/receive signals to/from other devices. In addition, the processor 120 may process signals to be transmitted, transmit the processed signals to the transmitter 112 and process signals received by the receiver 114.

The processor 120 may store information included in an exchanged message in the memory 130 as necessary. The UE 100 having the aforementioned configuration may perform the aforementioned methods according to embodiments of the present invention.

The transmitter 212 and the receiver 214 of the BS 200 may be configured to transmit/receive signals to/from other BSs and UEs. The processor 220 of the BS 200 may be functionally connected to the transmitter 212 and the receiver 214 to control the transmitter 212 and the receiver 214 to transmit/receive signals to/from other devices. In addition, the processor 220 may process signals to be transmitted, transmit the processed signals to the transmitter 212 and process signals received by the receiver 214. The processor 220 may store information included in an exchanged message in the memory 230 as necessary. The BS 200 having the aforementioned configuration may perform the aforementioned methods according to embodiments of the present invention.

The processors 120 and 220 of the UE 100 and the BS 200 control (e.g. adjust and manage) operations of the UE 100 and the BS 200. The processors 120 and 220 may be respectively connected to the memories 130 and 230 for storing program code and data. The memories 130 and 2130 are respectively connected to the processors 120 and 220 and store operating systems, applications and general files.

The processors 120 and 220 may be called controllers, microcontrollers, microprocessors, microcomputers or the like. The processors 120 and 220 may be implemented using hardware, firmware, software or a combination thereof. When embodiments of the present invention are implemented using hardware, application specific integrated circuits (ASICs), digital signal processors (DSPs), digital signal processing devices (DSPDs), programmable logic devices (PLDs), field programmable gate arrays (FPGAs), etc., which are configured to perform the present invention, may be included in the processors 120 and 220.

The aforementioned method may be implemented as programs executable in computers and executed in general computers that operate the programs using computer readable media. In addition, data used in the aforementioned method may be recorded in computer readable recording media through various means. It should be understood that program storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of setting resources to be used for a base station (BS) to perform full duplex radio (FDP) communication in an FDR communication environment supporting carrier aggregation, the method performed by the base station and comprising:
   estimating channel information on a plurality of frequency resources available through carrier aggregation;
   transmitting first channel information estimated for the plurality of frequency resources to a counterpart node with which the BS is to perform FDR communication;
   receiving second channel information estimated by the counterpart node; and
   selecting a frequency resource to be used for the FDR communication from among the plurality of frequency resources in consideration of the first channel information transmitted to the counterpart node and the second channel information received from the counterpart node,
   wherein the BS selects the frequency resource such that the following equation is satisfied, $$k_F^* = \underset{k_F^*=1,\ldots,K}{\operatorname{argmax}} \; [(1+\gamma_b^F h_{ab}^F)(1+\gamma_a^F h_{ba}^F)] \quad \text{[equation]}$$

wherein K indicates the number of the plurality of frequency resource, $k_F$ indicates an index of the frequency resource selected from among the plurality of frequency resources, $\gamma_a^F$ indicates a received signal-to-noise ratio (SNR) of the BS $\gamma_b^F$ indicates a received SNR at the counterpart node, $h_{ab}^F$ indicates a channel value included in the first channel information, and $h_{ba}^F$ indicates a channel value included in the second channel information.

2. The method according to claim 1, wherein an achievable sum rate of an FDR communication system including the BS and the counterpart node is represented by the following equation, $$C^F = [\log(1+\gamma_b^F h_{ab}^F) + \log(1\gamma_a^F h_{ba}^F)] \quad \text{[equation]}$$

wherein $C^F$ indicates the achievable stun rate of the FDR communication system.

3. The method according to claim 1, wherein the selected frequency resource is simultaneously occupied by the BS and the counterpart node during the FDR communication.

4. The method according to claim 1, wherein the frequency resource is a component carrier (CC), a cell or a spectrum.

5. The method according to claim 1, wherein the counterpart node performing the FDR communication with the BS is another BS or a user equipment (UE).

6. A BS for setting resources to be used to perform Full Duplex Radio (FDR) communication in an FDR communication environment supporting carrier aggregation, comprising:
   a transmitter;
   a receiver; and
   a processor connected to the transmitter and the receiver to set resources used to perform FDR communication,
   wherein the processor is configured to estimate channel information on a plurality of frequency resources available for the BS through carrier aggregation, to control the transmitter to transmit first channel information estimated for the plurality of frequency resources to a counterpart node with which the BS is to perform the FDR communication, to control the receiver to receive second channel information estimated by the counterpart node, and to select a frequency resource to be used for the FDR communication from among the plurality of frequency resources in consideration of the first channel information transmitted to the counterpart node and the second channel information received from the counterpart node,
   wherein the BS selects the frequency resource such that the following equation is satisfied, $$k_F^* = \underset{k_F^*=1,\ldots,K}{\operatorname{argmax}} [(1+\gamma_b^F h_{ab}^F)(1+\gamma_a^F h_{ba}^F)] \qquad \text{[equation]}$$

wherein K indicates the number of the plurality of frequency resources, $k_F$ indicates an index of the frequency resource selected from among the plurality of frequency resource, $\gamma_a^F$ indicates a received signal-to-noise ratio (SNR) of the BS, $\gamma_b^F$ indicates a received SNR at the counterpart node, $h_{ab}^F$ indicates a channel value included in the first channel information, and $h_{ba}^F$ indicates a channel value included in the second channel information.

7. The BS according to claim 6, wherein an achievable sum rate of an FDR communication system including the BS and the counterpart node is represented by the following equation, $$C^F = [\log(1+\gamma_b^F h_{ab}^F) + \log(1\gamma_a^F h_{ba}^F)] \qquad \text{[equation]}$$

wherein $C^F$ indicates the achievable sum rate of the FDR communication system.

8. The BS according to claim 6, wherein the selected frequency resource is simultaneously occupied by the BS and the counterpart node during the FDR communication.

9. The BS according to claim 6, wherein the frequency resource is a component carrier (CC), a cell or a spectrum.

10. The BS according to claim 6, wherein the counterpart node performing the FDR communication with the BS is another BS or a user equipment(UE).

\* \* \* \* \*